United States Patent
Kobayashi et al.

[19]

[11] Patent Number: 6,064,925
[45] Date of Patent: May 16, 2000

[54] NAVIGATION ROADWAY AND NAVIGATION SYSTEM

[75] Inventors: Minoru Kobayashi, Fujimi; Toru Saitoh, Urawa, both of Japan

[73] Assignee: Honda Giken Kogyo Kabushiki Kaisha, Tokyo, Japan

[21] Appl. No.: 08/924,033

[22] Filed: Aug. 28, 1997

[30] Foreign Application Priority Data

Aug. 28, 1996 [JP] Japan .................................. 8-226226

[51] Int. Cl.⁷ .............................................. G06F 165/00
[52] U.S. Cl. ............................ 701/23; 701/208; 701/216
[58] Field of Search ................................ 701/23, 25, 26, 701/28, 208, 210, 213, 214, 216, 201

[56] References Cited

U.S. PATENT DOCUMENTS

| | | | |
|---|---|---|---|
| 4,656,406 | 4/1987 | Houskamp ............................. | 318/587 |
| 4,716,530 | 12/1987 | Ogawa et al. ......................... | 701/23 |
| 5,267,173 | 11/1993 | Tanizawa et al. .................. | 364/478.17 |
| 5,307,277 | 4/1994 | Horano ................................... | 701/207 |
| 5,329,449 | 7/1994 | Tanizawa et al. ..................... | 701/25 |
| 5,552,990 | 9/1996 | Ihara et al. ............................. | 701/208 |
| 5,778,327 | 7/1998 | Simmoms et al. ..................... | 701/23 |

*Primary Examiner*—Tan Nguyen
*Attorney, Agent, or Firm*—Lyon & Lyon LLP

[57] ABSTRACT

A navigation system including a navigation roadway, which is simple in construction and thus cost-effective, ensures a vehicle to navigate even where a roadway curves, branches out, or merges with another. This navigation system comprises a mark-tracking navigator and a map-referring navigator. The mark-tracking navigator navigates the vehicle along a navigation-guiding mark on the roadway by detecting the navigation-guiding mark, and the map-referring navigator navigates the vehicle along a predetermined track on a route map of data by referring to the position of the vehicle which is detected by position-detecting means. The system selects either the mark-tracking navigator or the map-referring navigator to navigate the vehicle in correspondence with the condition of the roadway. The sections where the roadway extends straight or curves gradually are provided with the navigation-guiding mark, and the sections where the roadway branches out or merges with another or curves sharply are not provided with the navigation-guiding mark.

14 Claims, 4 Drawing Sheets

NAVIGATION ROADWAY AND NAVIGATION SYSTEM

FIELD OF THE INVENTION

The present invention relates to a roadway with a navigation-guiding mark and to a system which navigates a vehicle to a predetermined location by detecting the navigation-guiding mark.

BACKGROUND OF THE INVENTION

Several such navigation systems have been proposed. For example, there is a system which recognizes, by viewing with a camera, a white line drawn on a roadway and navigates a vehicle along this white line. Also, there is another system which navigates a vehicle along a roadway by detecting a magnetic tape or magnetic line, or magnetic nails which are provided in a row along the roadway. All these systems employ one type or another of navigation-guiding mark including white line, magnetic tape, and magnetic nail; and vehicles navigate along the guiding mark by detecting it.

In this type of navigation system, as long as the guiding mark extends substantially straight or in a gentle curve, the detection of the guiding mark is relatively easy, so the control of navigation is relatively simple. However, if the guiding mark extends in an abrupt curve, or if it branches out, or if it merges with another, the detection or identification of the guiding mark or marks becomes difficult. If the system were to recognize such diversifications in the guiding mark, the design of the system would be complex, requiring a much higher cost for construction.

More specifically, the vehicle needs a device which can identify each of the ways where the roadway divides into two, or the roadway merges with another. This extra device requiring a high resolution sensor and an elaborate processing increases the manufacturing cost of the system. In addition, the roadways need to be provided with complex navigation-guiding marks to help the device identify the branching and merging of the roadways, which increases the cost for building the infrastructure necessary for the system.

Furthermore, as the direction of the vehicle comes to differ from the direction of the motion of the vehicle where the roadway curves abruptly, the sensor of the system is likely to miss the guiding mark.

As a result, the system becomes unable to track the route which is defined by the guiding mark. This is a serious problem which obliterates automatic navigation.

SUMMARY OF THE INVENTION

The present invention is conceived to solve the above mentioned problems. It is an object of the present invention to provide a navigation system which ensures navigation of a vehicle even where a roadway curves, branches out, or merges with another. Another object of the present invention is to provide a navigation system which is simple in construction, thus, cost-effective and which does not require much cost for building the road infrastructure necessary for the system.

These objects of the present invention are realized by a navigation system which comprises a mark-tracking navigator and a map-referring navigator. The mark-tracking navigator navigates a vehicle along a navigation-guiding mark on the roadway by detecting the navigation-guiding mark, and the map-referring navigator navigates the vehicle along a predetermined track by referring the position of the vehicle which is detected by position-detecting means to a route map of data. The system selects either the mark-tracking navigator or the map-referring navigator to navigate the vehicle in correspondence with the condition of the roadway.

The system applies the mark-tracking navigator where the roadway extends straight or curves gently, and it applies the map-referring navigator where the roadway branches out or merges with another or curves sharply as such condition of the roadway makes detection of the navigation-guiding mark difficult. Therefore, the system does not require a high sensitivity for the mark-tracking navigator, so the system is relatively simple. It can be constructed cost-effectively.

It is preferable that a map-reference priority section be provided on the roadway and that selection-controlling means of the system select the map-referring navigator to navigate the vehicle through the map-reference priority section. In this case, the sections where the roadway branches out or merges with another or curves sharply are designated as the map-reference priority sections, and these sections are preferably mark-vacant, i.e., without the navigation-guiding mark.

In this case, the navigation-guiding mark is not necessary for the sections where the roadway branches out or merges with another or curves sharply. Therefore, the infrastructure necessary for the system can be made simple and cost-effective.

Furthermore, it is preferable that the map-referring navigator be used as a backup while the mark-tracking navigator, which is selected by the selection-controlling means, is navigating the vehicle. With this design of the system, the map-referring navigator can take over control of the vehicle to continue the navigation if the mark-tracking navigator malfunctions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
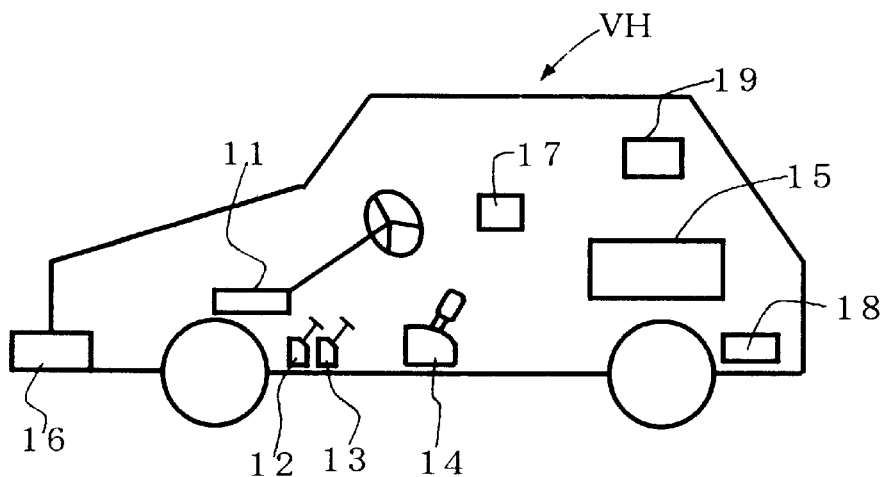
FIG. 1 is a schematic drawing of the design of a vehicle which is used in a navigation system of the present invention.
Figure 2:
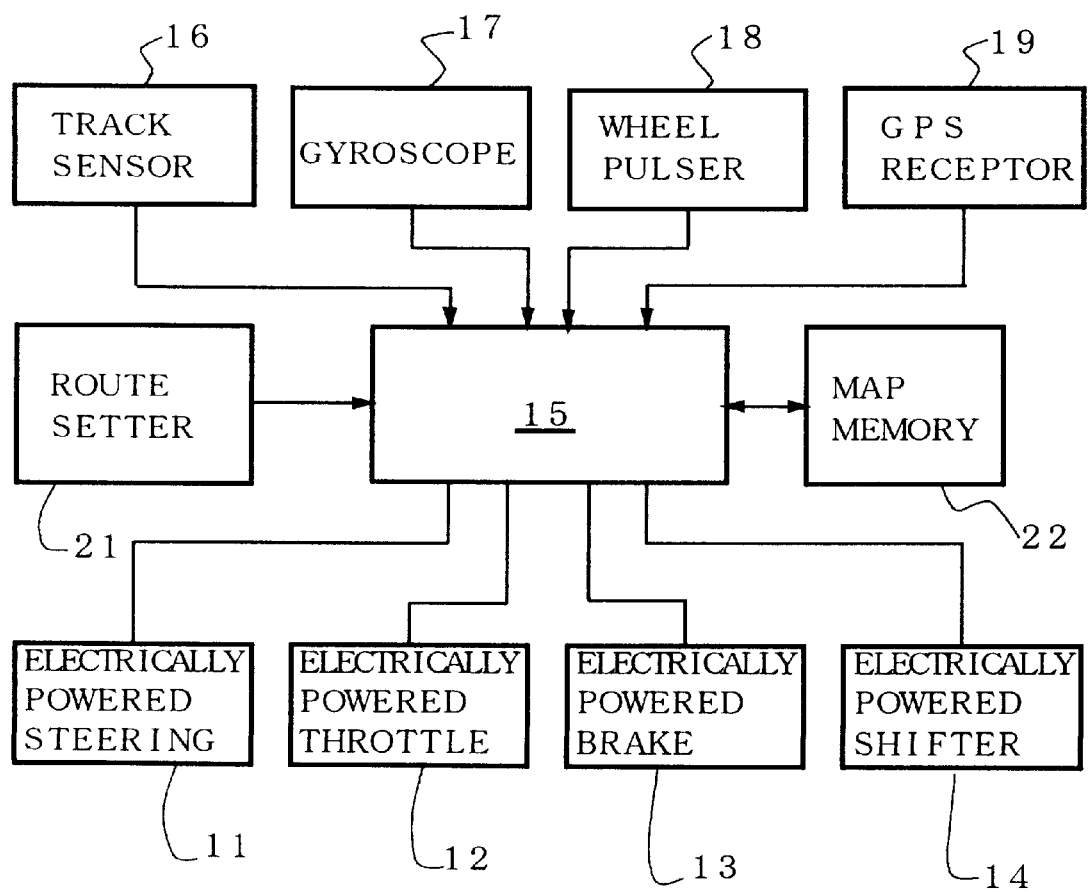
FIG. 2 is a block diagram of navigation equipment which is mounted in the vehicle.

FIG. 1 shows an example of a vehicle design which is used in a navigation system of the present invention, and FIG. 2 shows the construction of the portion of the navigation system which is mounted in the vehicle. The vehicle VH includes an electrically powered steering 11, an electrically powered throttle 12, an electrically powered brake 13, and an electrically powered shifter 14. All of them are activated by control signals which are delivered from a controller 15, and the vehicle VH is capable of cruising without manual control by driver. In addition, the vehicle VH is equipped with a portion of a wireless control system. Therefore, it is capable of receiving radio signals which are transmitted from an outside host computer. These signals include such commands as start and stop. As such, the vehicle VH can navigate without a driver aboard.

This navigation system navigates the vehicle VH by detecting a navigation-guiding mark which is provided on a roadway (i.e., mark-tracking navigation). For the detection of the marks, the vehicle VH is equipped with a track sensor 16. The navigation-guiding mark can be a white line, a magnetic tape, or a series of magnetic nails. Here, a white line is applied as an example for the navigation-guiding mark, and the track sensor 16 comprises a camera which views the white line and sends the image data to the controller 15.

The white line for guiding the navigation of the vehicle VH is provided along the track in which the vehicle VH will travel. The track sensor 16 views the surface of the roadway including the white line and sends the data of the image to the controller 15. The controller 15, after processing the data, controls the electrically powered steering 11, throttle 12, brake 13, and shifter 14 so that the vehicle VH will move to track the white line.

Figure 3:
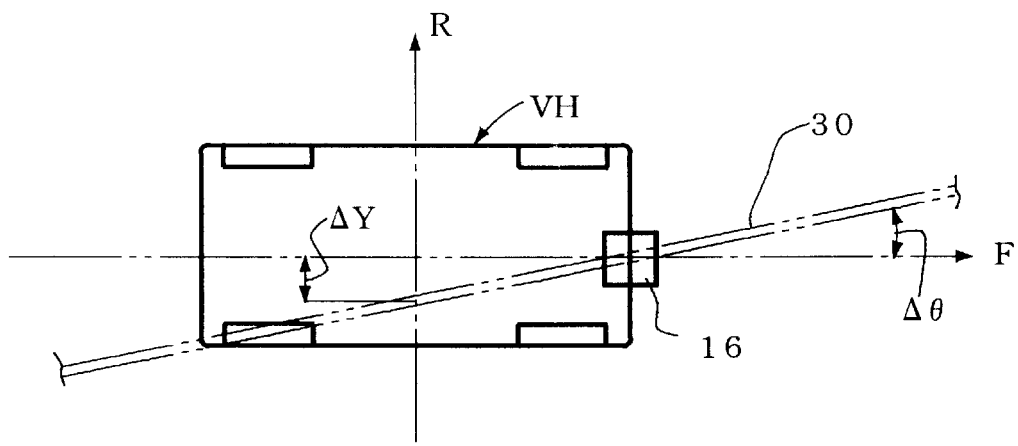
FIG. 3 is a bottom view showing a positional relation between a navigation-guiding white line and the vehicle, which is equipped with a sensor to track the line.

For example, when the vehicle VH is over the white line 30 as shown in FIG. 3, the track sensor 16 detects the white line 30. The controller 15, which receives the image data from the track sensor 16, calculates the angular deviation $\Delta\theta$ of the direction F of the vehicle VH from the white line 30 and the lateral deviation $\Delta Y$ of the track sensor 16 from the white line 30 at the longitudinal center of the vehicle VH and performs the above mentioned control to bring these deviations to nil. As a result, the vehicle VH is driven along the white line 30.

Figure 4:
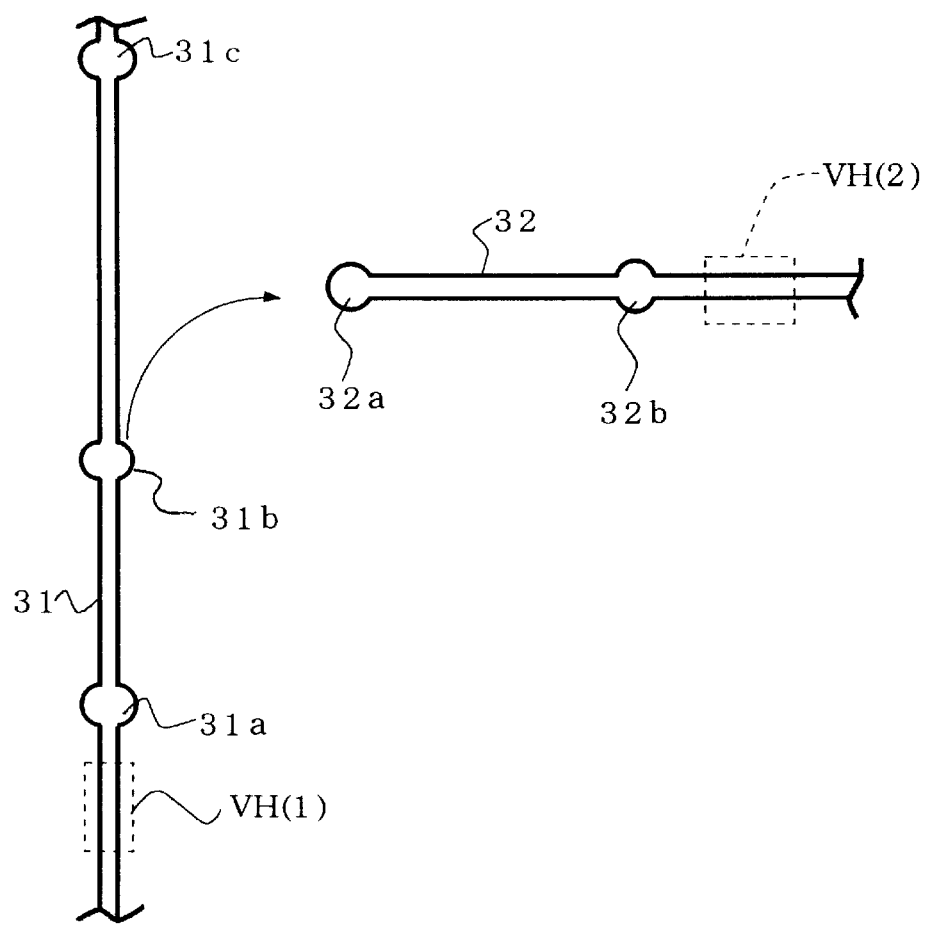
FIG. 4 shows some examples of navigation-guiding white lines.

FIG. 4 shows an example of such white lines. In this example, a straight roadway extending upward in the drawing is met with another straight roadway extending laterally. The upward roadway is provided with a first white line 31, and the lateral roadway is provided with a second white line 32. Note that the left end of the second white line 32 is away from the first white line 31 and that the second white line 32 does not intersect the first white line 31 although the two roadways merge together (or this example may be taken as a case where one roadway branches into two).

Each white line 31 or 32 has a series of marks 31a, 31b, 31c, or 32a, 32b and so on, which are positioned with a predetermined pitch. When the vehicle VH passes these marks, the system recognizes each mark and renews the data which describes the current position of the vehicle VH. These marks are formed, for example, as shown in the figure by adding portions of circular expansion to the line, and the marks are applied especially to the positions where the track starts or ends and where the roadway starts or ends branching or merging.

The vehicle VH is also capable of following a track which is indicated on a map (i.e., map-referring navigation). For this mode of navigation, the vehicle VH is equipped with a gyroscope 17, which detects the yaw rate (r) of the vehicle VH during the drive; a wheel pulser 18, which generates a pulse with the frequency corresponding to the rotational speed of the wheels; and a GPS receptor 19, which receives a signal from a global positioning system. In addition, the vehicle VH includes a route setter 21, which accepts a route set for the vehicle to travel, and a map memory 22, which stores data of route map.

Signals generated from the gyroscope 17 and the wheel pulser 18 are transmitted to the controller 15. There, the yaw rate (r) of the vehicle movement is calculated from the signal of the gyroscope 17, and the velocity (Vr) of the vehicle VH is calculated from the pulse of the wheel pulser 18. The travel of the vehicle VH can be tracked by the following calculations:

$$\theta = \theta(0) + \Sigma(r \times \Delta t) \quad (1)$$

$$X = X(0) + \Sigma\{Vr \times \cos(\theta + \beta) \times \Delta t\} \quad (2)$$

$$Y = Y(0) + \Sigma\{Vr \times \sin(\theta + \beta) \times \Delta t\} \quad (3)$$

$\theta$, X, and Y are the direction and position coordinates of the vehicle, and $\theta(0)$, $X(0)$, and $Y(0)$ are the respective, initial coordinates of the above equations. $\beta$ is the slip angle of the center of gravity of the vehicle, and it is calculated from the observation of a kinematic model of the vehicle VH. The above equations are calculated in analysis of signals which are generated from the gyroscope 17 and the wheel pulser 18 to track the vehicle. If the initial direction and position coordinates of the vehicle (at the start of tracking the vehicle position) are known, the travel of the vehicle can be tracked on the map. Initial position coordinates can be detected, for example, in analysis of the signal coming from the GPS receptor 19.

Figure 5:
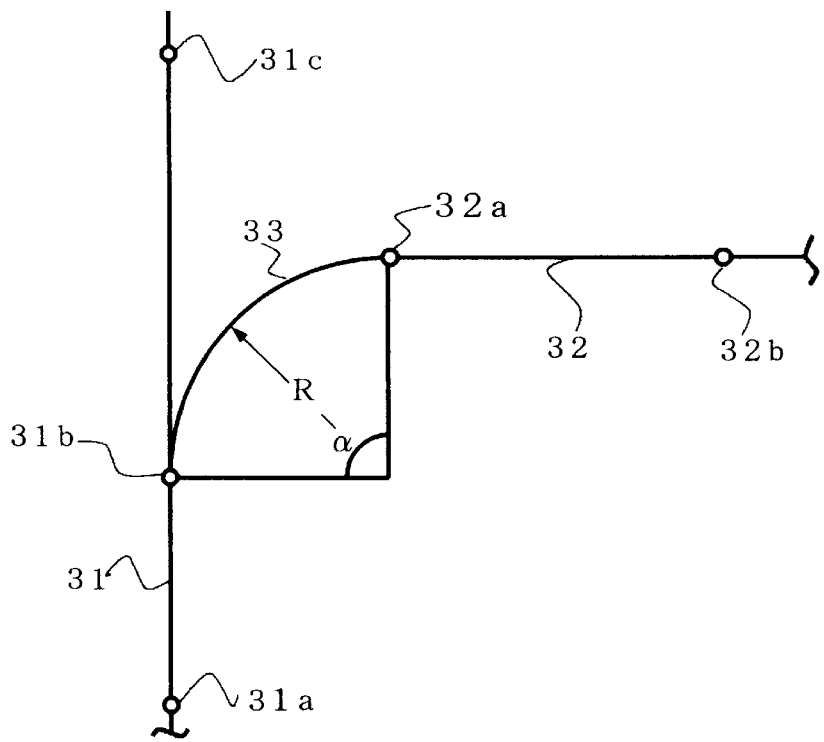
FIG. 5 is an example of route map which is stored in a map memory.

Geographical data and data of navigation-guiding white lines are stored in the map memory 22 of the system. The data of navigation-guiding white lines include link information which describes each link of navigation-guiding white lines. Each link is composed of a segment of white line and a mark at a starting end and another mark at an finishing end of the segment. For example, this information indicates individually the positions of white lines 31, 32, . . . and respective marks 31a, 31b, . . . as shown in FIG. 5 on the route map. The information for each link comprises, for example, the number assigned to the mark at the starting point, the length of the link, the coordinates of the mark at the finishing point, the radial angle of the curve of the link, the radius of curvature of the link, the distance to the goal, and a flag to indicate the existence or nonexistence of white lines.

For example, the information of the link which extends from the mark 31a as the starting point to the mark 31b as the finishing point is given in the following form: the mark number of the starting point is set as "31a"; the length L of the link is set equal to the linear distance between these marks because the roadway is straight between these marks; the coordinates (X, Y) of the mark 31b at the finishing point are set relative to the coordinates of the mark 31a at the starting point with the mark 31a being the origin; the radial angle of the curve and the radius of curvature are set as "0" and "∞" respectively because there is no curvature; the distance to the goal is set to the distance which must be traveled from the mark 31a at the starting point to reach the goal which is set with the route setter 21; and the flag is set as "ON" because there is a navigation-guiding white line 31 between these marks 31a and 31b as shown in FIG. 4.

Likewise, the information of the link from the mark 31b as the starting point to the mark 32a as the finishing point is given in the following form: the mark number of the starting point is set as "31b"; the length L of the link is set as the length of the curve along the curving track 33 between these marks 31b and 32a, which is defined only on the map (there is no white line in this section as shown in FIG. 4); the coordinates (X, Y) of the mark 32a at the finishing point are set relative to the coordinates of the mark 31b at the starting point with the mark 31b being the origin; the radial angle of the curve and the radius of curvature are set as "a" and "R" respectively from the curving track 33 as shown in FIG. 5; the distance to the goal is set to the distance which must be traveled from the mark 31b at the starting point to reach the goal; and the flag is set as "OFF" because there is no navigation-guiding white line between these marks 31b and 32a.

Now how this navigation system works to navigate the vehicle VH is described. For a navigation, first, a route is set with the route setter 21, for example, by a driver. If the route is routine, then it can be stored in memory so that it will be available for repeated use.

Furthermore, a route can be set also through the wireless control system from the outside host computer (not shown in the figures). After the route is set, the driver moves the vehicle on the white line. When the track sensor 16 detects the white line, the navigation of the vehicle becomes automatic. This navigation of the vehicle does not require the presence of a driver, so the driver may leave the vehicle.

With reference to FIG. 4, this navigation is described in detail for the case that the vehicle VH travels from the position which is indicated with VH(1) on the white line 31 to the position which is indicated with VH(2) on the white line 32. At the position VH(1), the track sensor 16 is capturing the white line 31. From the image signal of this white line, the controller 15 calculates the angle of deviation Δ Y of the vehicle with respect to the white line, and it controls the vehicle to make these deviations become nil. As a result, the vehicle navigates along the white line 31.

When the vehicle comes to the mark 31a and the track sensor 16 detects the mark 31a, the position of the vehicle is tracked in lock-on at a corresponding position on the map which is composed of data in the map memory 22. At this point, if the track sensor 16 were capable of distinguishing each mark one after another, the position of the vehicle could be immediately specified on the map. Since there is no distinction among the marks, the mark detected by the track sensor 16 is specified on the map in connection with the position of the vehicle which is tracked from the signal received by the GPS receptor 19.

After the position of the vehicle is specified from the mark on the map in this way, the track to the next mark 31b is set from the information of the link located between the mark 31a and the mark 31b, which is stored in the map memory 22. Then, the vehicle is controlled to travel along this track from the mark 31a at the starting point to the mark 31b at the finishing point. This can be carried out in the map-referring navigation, in which the position of the vehicle is traced on the map with the calculation of the above mentioned equations (1), (2), and (3) to control the travel of the vehicle along the track.

However, this system is designed to apply the mark-tracking navigation as long as the white line is available. The white line 31 exists between the mark 31a and the mark 31b as shown in FIG. 4, and the flag in the link information is "ON" indicating the existence of a white line. Therefore, the mark-tracking navigation is applied, and the vehicle is controlled to travel along the white line 31. While this navigation control is carried out, processes involved for the map-referring navigation are continued in background at the same time.

In case that the mark-tracking navigation fails for any reason, the map-referring navigation can take place in the control of the vehicle for smooth navigation. This is described further in the following.

When the vehicle in the mark-tracking navigation comes to the mark 31b and the track sensor 16 detects the mark 31b, the controller 15 reads out the information for the next link, i.e., the link from the mark 31b to the mark 32a, from the map memory 22. This link is shown not as a white line but as a vacant space because it is at a position where the white line 32 branches out from the white line 31. Thus, the mark-tracking navigation is not possible. The controller 15 determines the impossibility of performing the mark-tracking navigation from the "OFF" flag of the link information, which indicates the nonexistence of a white line, and the controller 15 switches the control into the map-referring navigation.

As a result, the travel of the vehicle is controlled to trace the track 33 on the map as shown in FIG. 5 in the map-referring navigation, and this is done in correspondence with the information of the link from the mark 31b at the starting point to the mark 32a at the finishing point. In this control, the position of the vehicle is calculated from the above equations (1), (2), and (3) in analysis of the signals which are coming from the gyroscope 17 and the wheel pulser 18, and the electrically powered steering 11, throttle 12, brake 13, and shifter 14 are all controlled to make the travel of the vehicle trace the track 33, which is set only on the map.

When the vehicle VH in the map-referring navigation comes to the mark 32a and the track sensor 16 detects the mark 32a, the information for the next link, which has the mark 32a as the starting mark and the mark 32b as the finishing mark, is read out from the map memory 22. This link is provided with the white line 32. Because the flag of this link information is "ON", the controller 15 returns the control into the mark-tracking navigation. As a result, the travel of the vehicle VH is controlled to trace the white line 32. In this way, the vehicle navigates from the position VH(1) to the position VH(2).

In this system, the map-referring navigation is executed while the vehicle is at the section where no white line is provided, i.e., when the flag which indicates the existence of a white line in the link information is "OFF". Moreover, the system is capable of switching into and executing the map-referring navigation whenever the mark-tracking navigation fails. For example, if the track sensor 16 loses the detection of the respective white line, the map-referring navigation takes over the control of the vehicle and continues the navigation. This is possible because the travel of the vehicle is traced on the map in the map-referring navigation continuously in background even while the mark-tracking navigation is being executed currently. If the track sensor 16 fails to track the white line for any cause, the system immediately switches into the map-referring navigation. In this case, the map-referring navigation can be considered as a backup to the mark-tracking navigation.

In this example of the navigation system, the sections where the roadways branch off or merge with one another are left vacant of navigation-guiding white lines. Therefore, the cost for constructing roadways with this type of navigation-guiding white line is relatively small, and the infrastructure necessary can be cost-effectively provided. Without intersections of the white lines on the roadways, the track sensor 16 of the system needs to detect only one white line, which is substantially straight. Because of this, the system can afford to operate with a relatively low resolving power for the track sensor 16. Thus, the system can be constructed also with a relatively low cost.

In the above example, the sections where the roadways branch off or merge with one another are left vacant of navigation-guiding white lines. In addition to these sections, such vacancy of white lines can be provided for in sections with sharp curves, where the track sensor 16 may fail to follow the white line. Moreover, such vacancy of white lines can be provided for tracks which guide a plurality of vehicles into respective carports.

Figure 6:
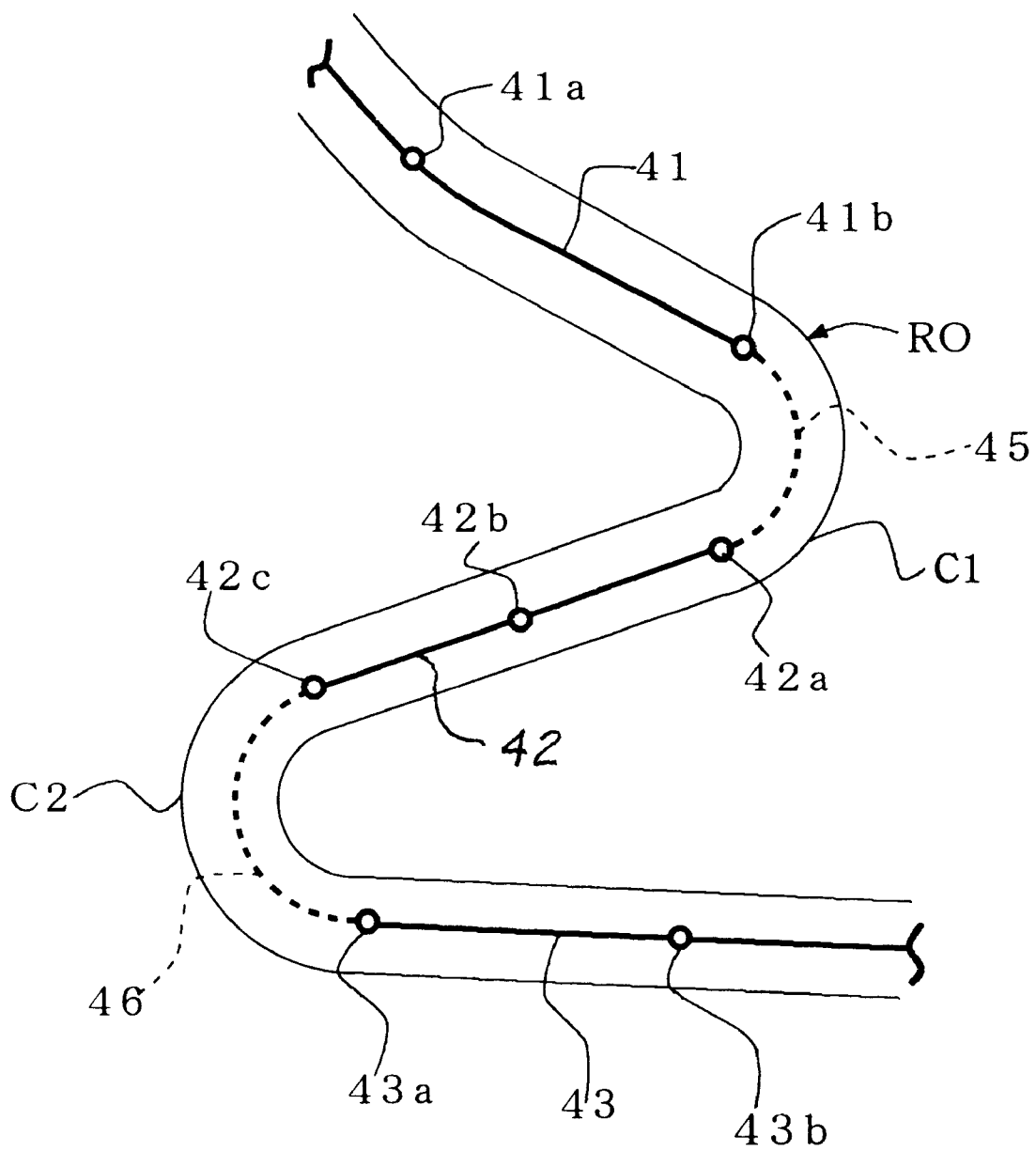
FIG. 6 is a plan view of an example of a navigation-guiding white line which is provided on a winding roadway.

For example, a winding roadway RO can be provided with a navigation-guiding white line to facilitate car navigation as shown in FIG. 6. In this case, the sections with sharp curves C1 and C2 of the roadway RO are left vacant of white lines, and the straight sections and sections with gentle curves are provided with white lines 41, 42, and 43 together with marks 41a, 42b, and 43b each mark at the middle of a respective white line. In addition, marks 41b, 42a, 42c, and 43a are provided at the starting and finishing points of the vacant sections.

While the vehicle is navigating through the sections of the roadway RO which are provided with the white lines, the system selects the mark-tracking navigation to move the vehicle along the white line. On the other hand, while the vehicle is going through the sections which do not have white lines, the map-referring navigation is executed with the information of the respective links which correspond with these sections, which are vacant of white lines. These links are set as tracks 45 and 46 in the link information. They are shown with broken lines in FIG. 6 for reference. The travel of the vehicle is controlled to trace these tracks 45 and 46.

Figure 7:
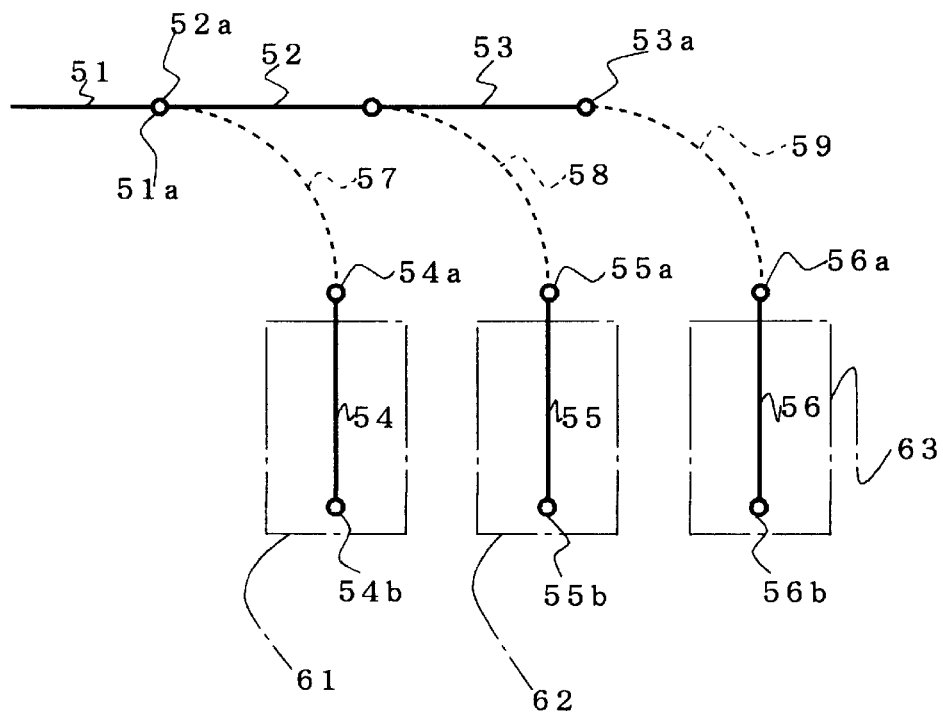
FIG. 7 is a plan view of an example of a navigation-guiding white line which is applied to guide vehicles into a plurality of carports.

In a case where a plurality of vehicles are navigated into respective carports 61, 62, and 63 as shown in FIG. 7, the front of each carport is left vacant of white lines. If a vehicle is to be brought into a carport 61, the vehicle first travels along the main white line 51 in the mark-tracking navigation until a mark 51a. When the vehicle reaches the mark 51a, the system switches into the map-referring navigation because the section does not have a white line between the mark 51a and another mark 54a. The map-referring navigation makes the vehicle travel along a track 57 which is set only on the map and shown with a broken line in the figure. When the vehicle reaches the mark 54a, the system returns to the mark-tracking navigation to guide the vehicle into the carport 61. In the same manner, other vehicles are brought into the other respective carports 62 and 63.

As describe in the above examples, vacancy of white lines is applied for sections which include sharp curves or for tracks which guide a plurality of vehicles into respective carports. In such cases, roadways require only straight or gently curving white lines. Therefore, the cost for constructing the infrastructure necessary for the system is relatively small. Furthermore, the track sensor which detects the white line in the mark-tracking navigation is required to detect only one straight or gently curving white line. Because of this simple requirement, the track sensor can be constructed with a relatively low cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A navigation system for guiding a vehicle on a roadway comprising:

a mark-tracking navigator for navigating the vehicle along a navigation-guiding mark by detecting said navigation-guiding mark, which is provided on the roadway;

a map-referring navigator with data of a route map, including position-detecting means for detecting a position of the vehicle independently of said navigation-guiding mark, said map-referring navigator navigating said vehicle along a predetermined track in said data of the route map by referring to the position of said vehicle which is detected by said position-detecting means; and selection-controlling means for selecting either said mark-tracking navigator or said map-referring navigator to navigate the vehicle in correspondence with a condition of the roadway.

2. The navigation system as set forth in claim 1 wherein:

a map-reference priority section is provided on said roadway; and said map-referring navigator is selected for said map-reference priority section by said selection-controlling means to navigate said vehicle.

3. The navigation system as set forth in claim 2 wherein:

data which indicate said map-reference priority section are included in said data of the route map.

4. The navigation system as set forth in claim 2 or 3 wherein:

said map-reference priority section is a mark-vacant section where said navigation-guiding mark is not provided.

5. The navigation system as set forth in claim 2 or 3 wherein:

said map-reference priority section is a section where said roadway branches out or merges with another.

6. The navigation system as set forth in claim 2 or 3 wherein:

said map-reference priority section is a section where said roadway curves with a radius of curvature which is less than a predetermined value.

7. The navigation system as set forth in claim 1 wherein:

while said mark-tracking navigator, which is selected by said selection-controlling means, is navigating said vehicle, said map-referring navigator works as a backup; and when said mark-tracking navigator malfunctions, said map-referring navigator takes over control of said vehicle for continuous navigation.

8. The navigation system as set forth in claim 4 wherein:

said map-reference priority section is a section where said roadway branches out or merges with another.

9. The navigation system as set forth in claim 4 wherein:

said map-reference priority section is a section where said roadway curves with a radius of curvature which is less than a predetermined value.

10. A navigation system for guiding a vehicle on a roadway with navigation-guiding marks comprising:

said navigation-guiding marks not being provided for sections where the roadway branches out or merges with another navigation roadway or curves sharply;

said navigation-guiding marks provided on the roadway only for sections where the roadway extends straight or curves gently;

a mark-tracking navigator for navigating a vehicle along said navigation-guiding marks on the roadway by detecting said navigation-guiding marks;

a map-referring navigator with data of a route map of the roadway, said map-referring navigator including a global positioning system for detecting a current position of the vehicle, said map-referring navigator navigating said vehicle along a predetermined track in said data of said route map at least along the roadway sections without navigation-guiding marks by referring to the current position of said vehicle which is detected by said position-detecting means; and selection-controlling means for selecting either said mark-tracking navigator or said map-referring navigator to navigate the vehicle in correspondence with a condition of said roadway.

11. The navigation system as set forth in claim 10 wherein:

a map-reference priority section is provided on said roadway; and said map-referring navigator is selected for said map-reference priority section by said selection-controlling means to navigate said vehicle.

12. The navigation system as set forth in claim 11 wherein:

data which indicate said map-reference priority section are included in said data of the route map.

13. The navigation system as set forth in claim 11 or 12 wherein:

said map-reference priority section is a section where said roadway curves with a radius of curvature which is less than a predetermined value.

14. The navigation system as set forth in claim 10 wherein:

while said mark-tracking navigator, which is selected by said selection-controlling means, is navigating said vehicle, said map-referring navigator works as a backup; and when said mark-tracking navigator malfunctions, said map-referring navigator takes over control of said vehicle for continuous navigation.

* * * * *